US007350287B2

(12) United States Patent
Yamagishi

(10) Patent No.: US 7,350,287 B2
(45) Date of Patent: Apr. 1, 2008

(54) VOICE COIL INSERTION JIG, SPEAKER PRODUCING METHOD USING THE JIG, AND SPEAKER PRODUCED BY USING THE JIG

(75) Inventor: Kiyoshi Yamagishi, Mie (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 482 days.

(21) Appl. No.: 10/501,468

(22) PCT Filed: Nov. 27, 2003

(86) PCT No.: PCT/JP03/15125

§ 371 (c)(1), (2), (4) Date: Jul. 14, 2004

(87) PCT Pub. No.: WO2004/052051

PCT Pub. Date: Jun. 17, 2004

(65) Prior Publication Data

US 2005/0084130 A1 Apr. 21, 2005

(30) Foreign Application Priority Data

Dec. 3, 2002 (JP) ............................ 2002-351069

(51) Int. Cl.
*B23P 19/00* (2006.01)

(52) U.S. Cl. ............................ 29/729; 29/594; 29/606; 29/609.1; 381/430

(58) Field of Classification Search .................. 29/594, 29/592.1, 609.1, 595, 736, 464, 606; 381/407, 381/425, 431; 181/171; 384/199
See application file for complete search history.

(56) References Cited

U.S. PATENT DOCUMENTS

| | | | | |
|---|---|---|---|---|
| 5,590,210 | A * | 12/1996 | Matsuo et al. | 381/412 |
| 6,343,136 | B2 * | 1/2002 | Tokusho et al. | 381/398 |
| 6,817,084 | B2 * | 11/2004 | Tokusho et al. | 29/594 |

FOREIGN PATENT DOCUMENTS

| | | |
|---|---|---|
| JP | 56-125194 | 10/1981 |
| JP | 57-160292 | 10/1982 |
| JP | 61-108299 | 5/1986 |
| JP | 11-55793 | 2/1999 |
| JP | 2001-45599 | 2/2001 |

* cited by examiner

*Primary Examiner*—Minh Trinh
(74) *Attorney, Agent, or Firm*—Wenderoth, Lind & Ponack, L.L.P.

(57) ABSTRACT

A method of manufacturing a speaker using a voice coil insertion jig including providing a voice coil insertion jig, deforming a plurality of moving pieces from a first position elastically toward a central boss side to a second position, inserting the voice coil insertion jig into a voice coil, and restoring the plurality of moving pieces to the first position and holding the voice coil using the plurality of moving pieces. Moreover, the method includes inserting the voice coil insertion jig into a magnetic gap forming a magnetic circuit of the speaker, adhering an inner circumference of a diaphragm of the speaker to the voice coil, adhering an outer circumference of the diaphragm to a frame of the speaker, and deforming the plurality of moving pieces elastically from the first position from toward the center boss side to the second position and extracting the voice coil insertion jig from the magnetic gap.

1 Claim, 5 Drawing Sheets

PRIOR ART

PRIOR ART

PRIOR ART

VOICE COIL INSERTION JIG, SPEAKER PRODUCING METHOD USING THE JIG, AND SPEAKER PRODUCED BY USING THE JIG

BACKGROUND OF THE INVENTION (1) Field of the Invention

The present invention relates to a voice coil insertion jig used in manufacturing speakers that are incorporated in various acoustic appliances, a method of manufacturing a speaker using this jig, and a speaker manufactured by using this jig.

(2) Description of Related Art

The prior art is explained by referring to FIGS. 3 to 5. FIG. 3 is a sectional view of a speaker, FIG. 4 is a perspective exploded view of a voice coil assembling jig used when assembling the speaker, and FIG. 5 is a sectional view illustrating the assembling process of the voice coil.

A structure of a speaker is described in FIG. 3. Magnetic circuit 1 is composed of a lower plate 1*a* having a center pole 1*b*, a magnet 1*c* coupled on a lower plate 1*a*, and an upper plate 1*d* coupled on magnet 1*c*. Magnetic circuit 1 has a magnetic gap 1*e* between upper plate 1*d* and center pole 1*b*. A frame 2 is coupled to upper plate 1*d*. A diaphragm 3 is coupled to frame 2 by way of an edge 3*a* formed on an outer circumference of diaphragm 3. A voice coil 4 is composed of a coil 4*a* and a bobbin 4*b*. Coil 4*a* is inserted in magnetic gap 1*e*, and an internal circumference of diaphragm 3 is coupled to a specified position of bobbin 4*b*. An outer circumference of damper 5 is coupled to frame 4, and an inner circumference of damper 5 is coupled to bobbin 4*b*. In this constitution, voice coil 4 is supported movably up and down.

In the manufacturing process of such a speaker, what requires the highest precision is the inserting process of voice coil 4 into magnetic gap 1*e*.

A conventional voice coil insertion jig disclosed in Japanese Laid-open Utility Model No. 57-160292 is explained by referring to FIGS. 4 and 5. The conventional voice coil insertion jig is composed of a jig main body 11, a gauge tube 12, a slit 13, and a spring 14.

Spring 14 is assembled into an inside of jig main body 11, and generates a force for opening slit 13. The insertion jig is inserted into bobbin 4*b* while closing slit 13, and after positioning, voice coil 4 is fixed by the pressure of spring 14. Together with the jig, voice coil 4 is inserted into center pole 1*b* of magnetic circuit 1. That is, voice coil 4 is inserted into magnetic gap 1*e*. At this time, depending on the material thickness of gauge tube 12, the position of voice coil 4 in the radial direction is defined. In this state, frame 2 is adhered and coupled to magnetic circuit 1. (Frame 2 may be first adhered and coupled to magnetic circuit 1.) After adhering damper 5 and diaphragm 3 to frame 2 and bobbin 4*b*, the insertion jig is pulled out of the speaker. Finally, dust cap 6 is adhered and coupled to diaphragm 3, and the speaker is manufactured.

Thus, in the speaker manufacturing process, the voice coil insertion jig is required to have a high precision for positioning voice coil 4.

As the appliance is reduced in size recently, a speaker of small size and high efficiency is demanded. For this purpose, magnetic gap 1*e* is required to be much narrower.

BRIEF SUMMARY OF THE INVENTION

It is hence an object of the invention to solve the above problem, and present a voice coil insertion jig for realizing a speaker of high performance with a narrower magnetic gap by enhancing the positioning precision of the voice coil in the magnetic gap, a method of manufacturing a speaker using the jig, and a speaker manufactured by using the jig.

In one aspect of the invention, a voice coil insertion jig includes a base, a hollow cylindrical insertion part provided integrally in a lower part of the base, and a plurality of moving pieces provided integrally in an upper part of the base, the outside diameter being formed the plurality of moving pieces being larger than the outside diameter of the insertion part. The voice coil insertion jig also includes a central boss, provided above a center of the base, that is separate from the moving pieces, such that the plurality of moving pieces elastically contacts and holds the voice coil.

In another aspect of the invention, a method of manufacturing a speaker using a voice coil insertion jig includes deforming a plurality of moving pieces elastically to a central boss side, and inserting the moving pieces into a voice coil, restoring the elastic deformation, and holding the voice coil in a voice coil insertion jig, inserting the voice coil insertion jig into a magnetic gap forming a magnetic circuit, and adhering an inner circumference of a diaphragm to the voice coil, and adhering an outer circumference of the diaphragm to a frame. The method also includes deforming the plurality of moving pieces elastically to the central boss side, and extracting the voice coil insertion jig from the magnetic gap.

Thus, the speaker of the invention is manufactured using the voice coil insertion jig composed as described above.

DETAILED DESCRIPTION OF THE PREFERRED EMBODIMENTS

Figure 1A:
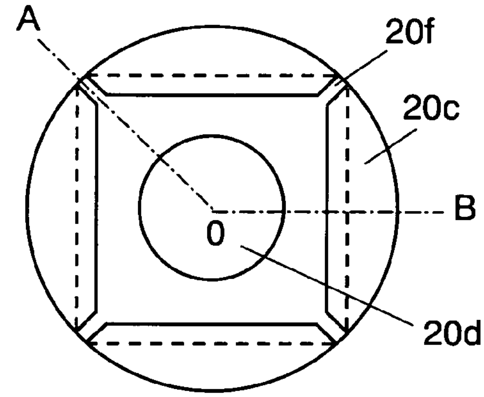
FIG. 1A is a top view of a preferred embodiment of voice coil insertion jig of the invention.

Preferred embodiments of a voice coil insertion jig of the invention are described below with reference to FIGS. 1A through 2C and FIG. 3. It should be understood that parts described in the preferred embodiments that are also included in the description of the prior art are identified with same reference numerals, and the explanation is omitted.

Preferred Embodiment 1

Figure 1B:
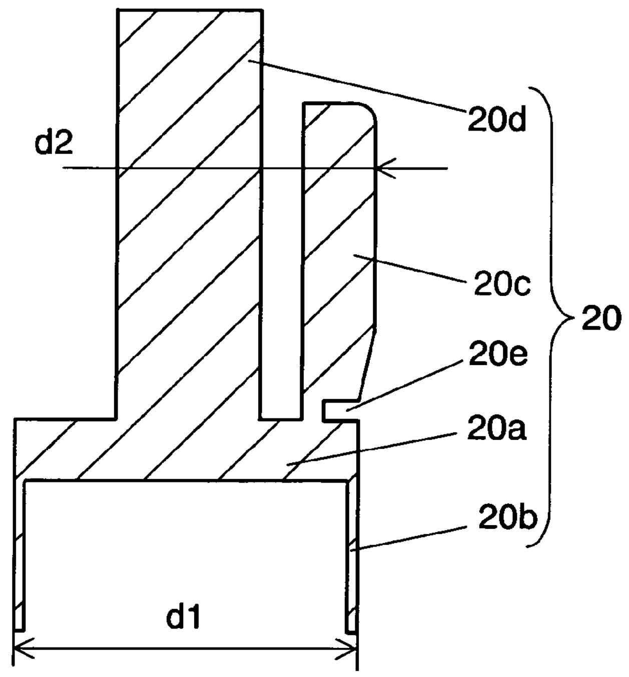
FIG. 1B is a sectional view along section line A-O-B of FIG. 1A.
Figure 1C:
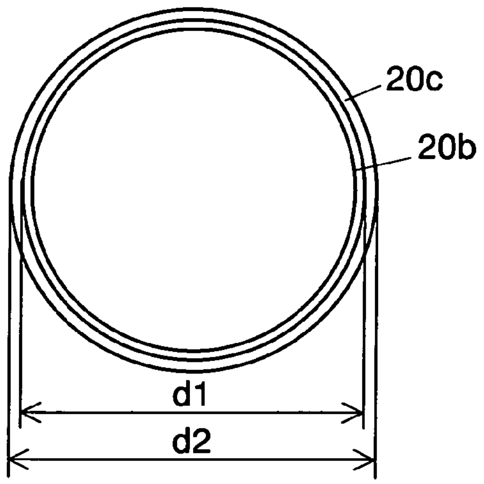
FIG. 1C is a bottom view of the voice coil insertion jig.

FIG. 1A is a top view of a preferred embodiment of a voice coil insertion jig. FIG. 1B is a sectional view along section line A-O-B side of FIG. 1A. FIG. 1C is a bottom view of the voice coil insertion jig.

A voice coil insertion jig 20 is composed of a base 20*a*, a hollow cylindrical insertion part 20*b* provided in a lower part of base 20*a*, a plurality of moving pieces 20*c*, and a central boss 20*d*. The plurality of moving pieces 20*c* are provided integrally in an upper part of base 20*a*, are separate from each other, and each include an outer circumference formed as an arc of nearly the same circumference. A diameter in upper parts of each of the plurality of moving pieces 20*c* is constant, and the diameter is smaller in lower parts of each of the plurality of moving pieces 20 because a slope is provided. Central boss 20*d* disposed apart from moving pieces 20*c* is formed so as to extend upward from a center of base 20*a*. An outer circumference of central boss 20*d* is opposite to each of the plurality of moving pieces 20*c* across a specified gap.

Each of moving piece 20*c* has a horizontal slit 20*e* at a lower outer side thereof. Moving pieces 20*c* are formed integrally in base 20*a* and are separated from each other by a vertical slit 20*f*.

Slit 20*f* is formed for reducing an outside diameter formed by moving pieces 20*c* when inserting voice coil insertion jig 20 into voice coil 4, or when extracting voice coil insertion jig 20 from voice coil 4. Therefore, the width of slit 20*f* is not particularly defined as far as moving pieces 20*c* can be inclined for an inserting and extracting process (it is further preferred to set the slit width to such an extent that moving pieces 20*c* may not be inclined over the limit of elasticity for the sake of the inserting and extracting process).

A diameter d1 of an outer circumference of base 20*a* and of insertion part 20*b*, and a diameter d2 formed by upper parts of moving pieces 20*c* in an ordinary state are such that d2>d1. A diameter of an outer circumference formed by lowest end parts of outer sides of moving pieces 20*c* is set nearly at d1, and d1 is set to be equal to an inner circumference of voice coil 4. As shown in FIG. 1A, moving pieces 20*c* include an inner wall side that is polygonal (tetragonal in the preferred embodiment) such that an angle is provided to facilitate defining vertical slit 20*f*. A width of vertical slit 20*f* represents an interval of mutually opposing sides of moving pieces 20*c*.

Central boss 20*d* is formed longer than moving pieces 20*c*, and is used as a knob in the working process.

Magnetic gap 1*e* between voice coil 4 and magnetic circuit 1 is assured by the thickness of insertion part 20*b*. An outer circumference of center pole 1*b* and an inner circumference of insertion part 20*b* are nearly equal, and only a slight allowance for insertion during assembling process is provided. Moreover, an interval between the outer circumference of center pole 1*b* and voice coil 4 is assured by a thickness of insertion part 20*b*, and hence an interval between upper plate 1*d* and voice coil 4 is also assured.

A method of assembling a speaker is explained.

By pushing moving pieces 20*c* of voice coil insertion jig 20 to the inner side to deform within an elastic deforming range, voice coil insertion jig 20 is inserted into voice coil 4. After inserting jig 20 up to a specified position, the inward pushing force applied to moving pieces 20*c* is released. As a result, moving pieces 20*c* elastically contact with the inner side of voice coil 4 in the restoring process. Thus, voice coil 4 is held in voice coil insertion jig 20.

While holding voice coil 4, insertion part 20*b* is fitted into center pole 1*b* of magnetic circuit 1, preliminarily adhered and coupled to frame 2, and inserted into magnetic gap 1*e*.

Figure 3:
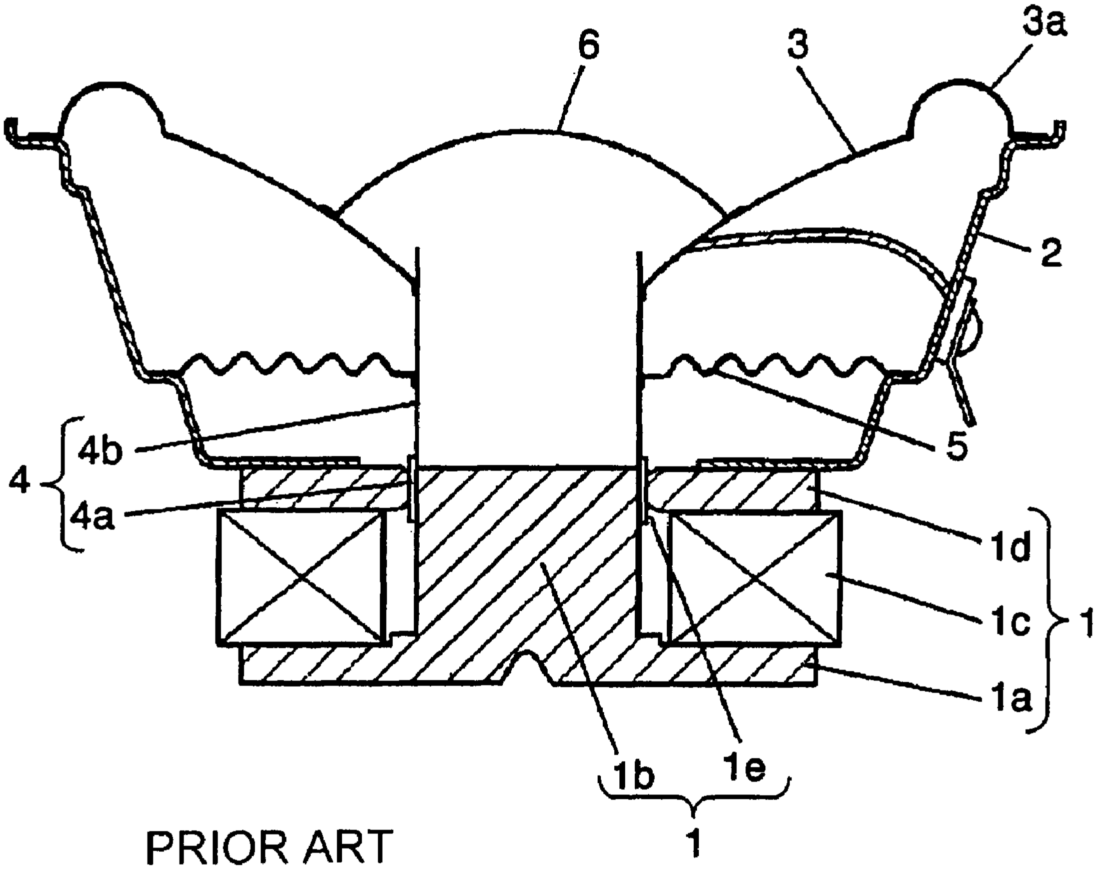
FIG. 3 is a side sectional view of a speaker.
Figure 4:
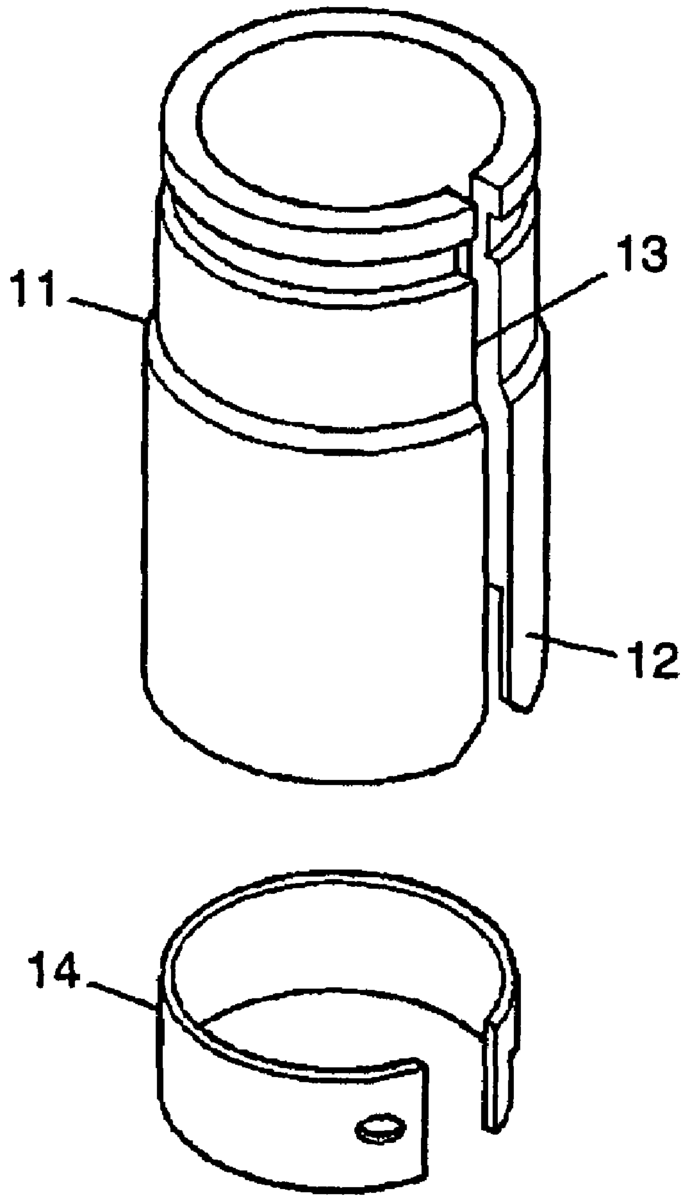
FIG. 4 is a perspective exploded view of voice coil assembling jig used in assembling of the speaker.
Figure 5:
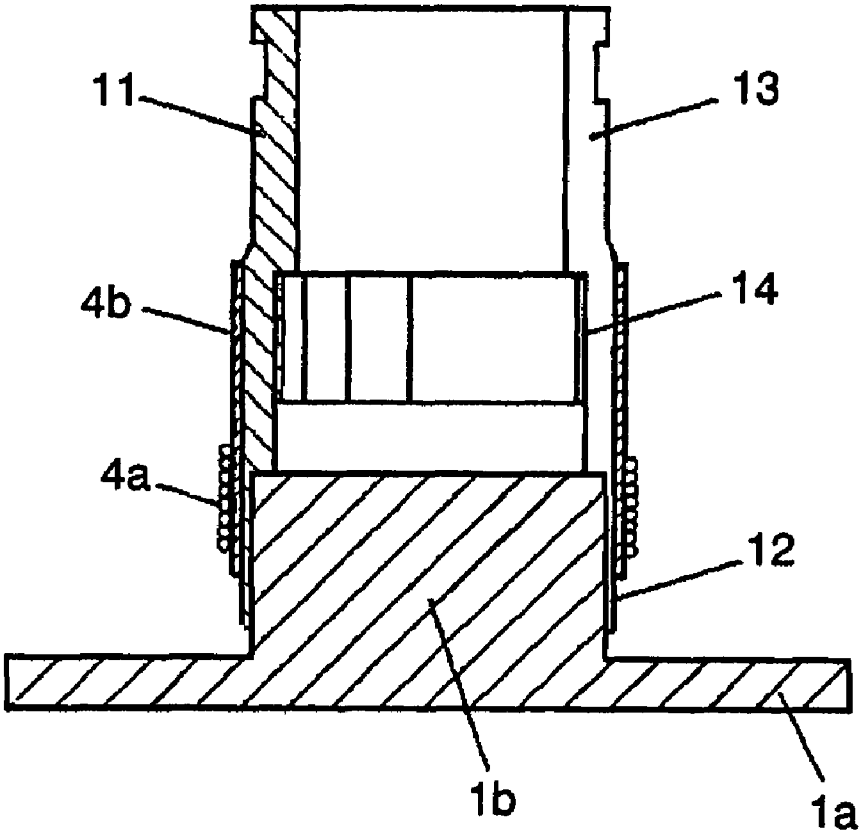
FIG. 5 is a sectional view illustrating the assembling process of the voice coil.

In succession, damper 5 and diaphragm 3 are adhered to frame 2 and coil bobbin 4*b* as shown in FIG. 3. Then, with moving pieces 20*c* being pushed to the central boss side, insertion jig 20 is pulled out. Finally, dust cap 6 is adhered to diaphragm 3.

In this manner, by using voice coil insertion jig 20 of the preferred embodiment, positioning and fixing of voice coil 4, and handling when assembling the speaker can be done easily by using moving pieces 20*c* and central boss 20*d*, so that the working efficiency can be enhanced.

Further, since insertion part 20*b* does not have slit 13 as in the prior art, but is a hollow tube, deformation of voice coil 4 can be prevented.

Moreover, magnetic gap 1*e* depends only on the thickness of this insertion part 20*b*, so that magnetic gap 1*e* is assured to remain constant. Hence, magnetic gap 1*e* can be narrowed, the magnetic efficiency enhanced, and a higher output realized, while the magnetic circuit is reduced in size and the speaker is reduced in weight.

In the preferred embodiment, a speaker having damper 5 is explained, but it can be similarly applied to a speaker without a damper.

Preferred Embodiment 2

Figure 2A:
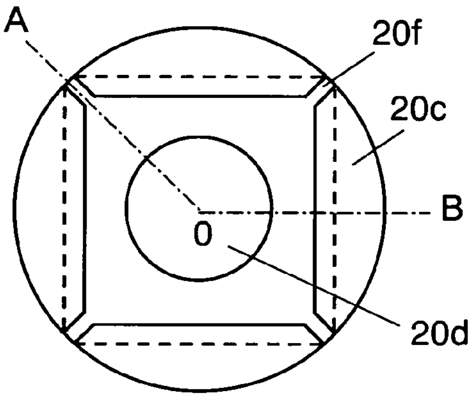
FIG. 2A is a top view of another preferred embodiment of the voice coil insertion jig of the invention.
Figure 2B:
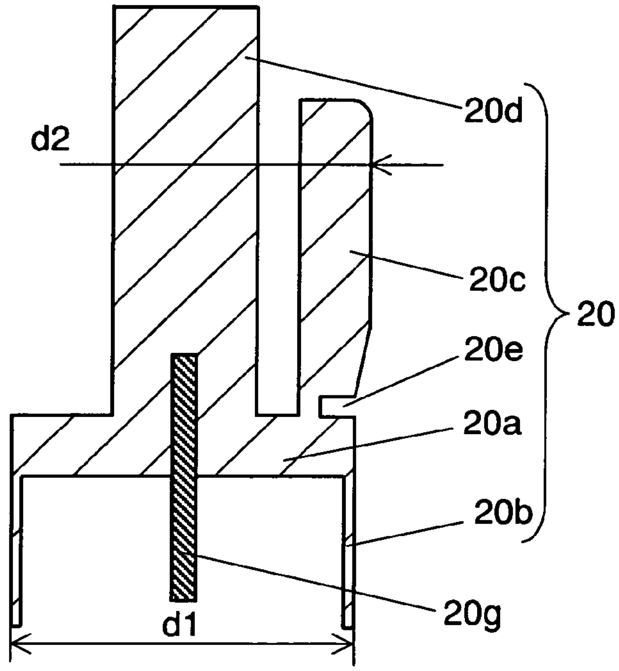
FIG. 2B is a sectional view along section line A-O-B of FIG. 2A.
Figure 2C:
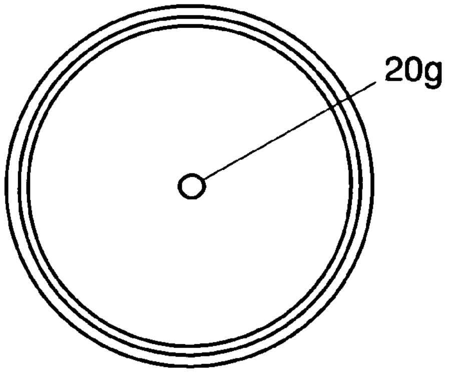
FIG. 2C is a bottom view of the voice coil insertion jig shown in FIG. 2A.

An alternate preferred embodiment of the invention is explained by referring to a top view of voice coil insertion jig 20 as shown in FIG. 2A, a sectional view along sectional line A-O-B in FIG. 2B, and a bottom view of jig 20 as shown in FIG. 2C. It should be understood that parts described in the preferred embodiment that are also included in the alternate embodiment are identified with same reference numerals, and the explanation is omitted.

Only different points from the preferred embodiment are described below. A first different point is that center pin 20*g* is provided in insertion part 20*b*. Center pin 20*g* is formed downward in the center of base 20*a*. In a center of center pole 1*b*, a center pole hole (not shown) for inserting center pin 20*g* is formed. In the manufacturing process, by inserting center pin 20*g* into the center pole hole, voice coil 4 is positioned.

As a result, in contrast to the preferred embodiment, it is not required to position voice coil 4 by defining the outer circumference of center pole 1*b* to be substantially the same as the diameter of inner circumference of insertion part 20*b*. Moreover, by inserting center pin 20*g*, it is easier to position voice coil 4 than in the preferred embodiment, and voice coil 4 can be positioned without depending on the diameter of center pole 1*b*. Consequently, jig 20 can be managed easily without preparing insertion jig 20 for the portion of difference in outside diameter of center pole 1*b*.

INDUSTRIAL APPLICABILITY

As described herein, the invention presents a voice coil insertion jig capable of assembling a speaker at excellent working efficiency and high precision without deforming the voice coil, a manufacturing method using the jig, and a speaker manufactured by this method.

The invention claimed is:

1. A method of manufacturing a speaker using a voice coil insertion jig, said method comprising:

providing the voice coil insertion jig, the voice coil insertion jig including a cylindrically-shaped base, a hollow cylindrical insertion part provided integrally on a lower surface of the base, a plurality of movable pieces provided integrally and perpendicularly on an outer circumference of an upper surface of the base such that a slit is between each of the plurality of movable pieces, an outside diameter defined by the plurality of movable pieces that is larger than an outside diameter of the insertion part, and a central boss provided above a center of the upper surface of the base that is separate from the movable pieces;

deforming the plurality of movable pieces elastically toward the central boss, and inserting the voice coil insertion jig into a voice coil;

causing the plurality of movable pieces to elastically contact with and hold the voice coil with the voice coil insertion jig;

inserting the voice coil insertion jig holding the voice coil into a magnetic gap forming a magnetic circuit of the speaker;

adhering an inner circumference of a diaphragm of the speaker to the voice coil, and adhering an outer circumference of the diaphragm to a frame of the speaker; and deforming the plurality of movable pieces elastically toward the central boss, and extracting the voice coil insertion jig from the voice coil.

* * * * *

UNITED STATES PATENT AND TRADEMARK OFFICE

CERTIFICATE OF CORRECTION

PATENT NO. : 7,350,287 B2
APPLICATION NO. : 10/501468
DATED : April 1, 2008
INVENTOR(S) : Kiyoshi Yamagishi It is certified that error appears in the above-identified patent and that said Letters Patent is hereby corrected as shown below:

IN THE TITLE

On the title page, item (54), line 1, "VOICE COIL INSERTION JIG, SPEAKER PRODUCING METHOD USING THE JIG, AND SPEAKER PRODUCED BY USING THE JIG" please change to --A METHOD OF MANUFACTURING A SPEAKER USING AN INSERTION JIG--.

Signed and Sealed this

Twenty-ninth Day of July, 2008

JON W. DUDAS
*Director of the United States Patent and Trademark Office*

UNITED STATES PATENT AND TRADEMARK OFFICE

CERTIFICATE OF CORRECTION

PATENT NO. : 7,350,287 B2
APPLICATION NO. : 10/501468
DATED : April 1, 2008
INVENTOR(S) : Kiyoshi Yamagishi It is certified that error appears in the above-identified patent and that said Letters Patent is hereby corrected as shown below:

IN THE TITLE

On the title page, item (54), and Column 1, lines 1-4, "VOICE COIL INSERTION JIG, SPEAKER PRODUCING METHOD USING THE JIG, AND SPEAKER PRODUCED BY USING THE JIG" please change to --A METHOD OF MANUFACTURING A SPEAKER USING AN INSERTION JIG--.

This certificate supersedes the Certificate of Correction issued July 29, 2008.

Signed and Sealed this

Twenty-sixth Day of August, 2008

JON W. DUDAS
*Director of the United States Patent and Trademark Office*